(12) United States Patent
Sakano et al.

(10) Patent No.: US 8,483,379 B2
(45) Date of Patent: Jul. 9, 2013

(54) TELEPHONE CONTROL APPARATUS AND TELEPHONE SYSTEM INCLUDING TELEPHONE CONTROL APPARATUS

(75) Inventors: Tsuneyuki Sakano, Saitama (JP); Jun Satou, Nagano (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 528 days.

(21) Appl. No.: 12/654,597

(22) Filed: Dec. 23, 2009

(65) Prior Publication Data
US 2010/0189247 A1    Jul. 29, 2010

(30) Foreign Application Priority Data
Jan. 28, 2009   (JP) .................................. 2009-016590

(51) Int. Cl.
*H04M 3/42*    (2006.01)
*H04M 1/00*    (2006.01)
*H04B 7/00*    (2006.01)

(52) U.S. Cl.
USPC ....... 379/207.16; 455/518; 455/519; 455/567

(58) Field of Classification Search
USPC ........ 379/207.16, 201.01, 202.01; 340/407.1; 455/415, 567, 518, 519, 416
See application file for complete search history.

(56) References Cited

U.S. PATENT DOCUMENTS

| | | | |
|---|---|---|---|
| 7,127,238 B2 * | 10/2006 | Vandermeijden et al. | 455/415 |
| 8,077,019 B2 * | 12/2011 | Hofmann et al. | 340/407.1 |
| 2005/0239514 A1 * | 10/2005 | Chiu | 455/567 |
| 2010/0119051 A1 * | 5/2010 | Belz et al. | 379/207.16 |

FOREIGN PATENT DOCUMENTS

| | | |
|---|---|---|
| CN | 1512739 A | 7/2004 |
| JP | 62-214759 A | 9/1987 |
| JP | 2003-009198 A | 1/2003 |

OTHER PUBLICATIONS

Japanese Office Action drafted on Nov. 2, 2012 with its English-language partial translation.
Chinese Office Action of Aug. 3, 2012, with its English-language partial translation.

* cited by examiner

*Primary Examiner* — Thjuan K Addy
(74) *Attorney, Agent, or Firm* — Rabin & Berdo, P.C.

(57) ABSTRACT

There is provided an telephone control apparatus including storing unit for storing ringtone patterns for each incoming call group relative to one or more telephone terminals; and controlling unit for performing a ring operation of the telephone terminal belonging to the incoming call group which is to receive a call based on the ringtone pattern specified from the storing unit, wherein when a certain incoming call group among the plural incoming call groups becomes in a call receiving condition, the controlling unit specifies the ringtone pattern corresponding to the incoming call group in a call receiving condition by referring to the storing unit and controls the telephone terminals belonging to the incoming call group in the call receiving condition to perform a ring operation based on the ringtone pattern.

16 Claims, 7 Drawing Sheets

|   | INCOMING CALL GROUP | RINGTONE PATTERN | PLURAL INCOMING CALL RECEIVING CONDITION (COMMON TO ALL GROUPS) |
|---|---|---|---|
| 1 | 10a | PATTERN 1 | PATTERN 5 |
| 2 | 10b | PATTERN 2 | |
| ⋮ | ⋮ | ⋮ | |

| INCOMING CALL GROUP | RINGTONE PATTERN (EXTERNAL LINE) | RINGTONE PATTERN (OTHERS) | PLURAL INCOMING CALL RECEIVING CONDITION (COMMON TO ALL GROUPS) |
|---|---|---|---|
| 1 | 10a | PATTERN 1 | PATTERN 3 |
| 2 | 10b | PATTERN 2 | PATTERN 4 |
| ... | ... | ... | ... |

TELEPHONE CONTROL APPARATUS AND TELEPHONE SYSTEM INCLUDING TELEPHONE CONTROL APPARATUS

BACKGROUND OF THE INVENTION

1. Field of the Invention

The present invention relates to a telephone control apparatus for setting a ringtone pattern corresponding to an incoming call group for a case where there is a call to the incoming call group of a telephone terminal and a telephone system including the telephone control apparatus.

2. Description of the Related Art

In related art, different incoming call groups can be respectively set to one or more keys provided in a multi-function telephone and, when there is an incoming call to the incoming call group set to the respective keys, the multi-function telephone which is set to the incoming call group or belongs to the incoming call group in other words is made to ring with a ringtone for the incoming call group. The ringtone for the incoming call group is common to all incoming call groups and the same ringtone has been used to ring when there is an incoming call to any of the incoming call groups. Further, since the same ringtone is used to ring every time when there is an incoming call to one of the incoming call groups and when there are calls to plural incoming call groups, it is difficult to distinguish which incoming call group is actually receiving the call. It is also difficult to distinguish whether there is an incoming call to one of the incoming call groups or there are incoming calls to two or more incoming call groups.

Thus, for example, a telephone device has been proposed which is capable of using different ringtones for each telephone terminal or each group of telephone terminals and corresponding to line types or lines of an incoming call (for example, see JP-A No. 62-214759).

Further, a telephone exchange has been proposed which is capable of using different ringtones for each direct inward dialing extension number even when the caller type is the same or using different ringtones for each telephone line group even when the caller type is the same (for example, see JP-A No. 2003-009198).

SUMMARY OF THE INVENTION

However, in the invention according to JP-A No. 62-214759, since a case where a single telephone terminal belongs to plural groups is not considered and a distinguishing method which can be used in such a case is not described, the ringtone can be distinctive only in a telephone system in which a single telephone terminal belongs to a single group. Further, in the invention according to JP-A No. 2003-009198, since a ringtone is used to ring corresponding to each telephone line group in an incoming call receiving condition, it is possible to distinguish to which telephone line group the incoming call is. However, similarly to the invention according to JP-A No. 62-214759, regarding an internal telephone belonging to plural telephone line groups, when more than one telephone line groups are in an incoming call receiving condition at the same time, it is difficult to distinguish whether one of the plural telephone line groups is receiving an incoming call or more than one telephone line groups are receiving incoming calls at the same time.

Thus, there is a need for a telephone control apparatus and a telephone system capable of not only setting ringtone patterns to each incoming call group to allow to distinguish to which incoming call group is receiving an incoming call but also, controlling telephone terminals to ring so that the conditions can be distinguished when a telephone terminal belongs to plural incoming call groups and the plural incoming call groups receive incoming calls at the same time.

A telephone control apparatus includes: storing unit for storing ringtone patterns for each incoming call group relative to one or more telephone terminals; and controlling unit for performing a ring operation of the telephone terminal belonging to the incoming call group which is to receive a call based on the ringtone pattern specified from the storing unit, wherein when a certain incoming call group among the plural incoming call groups becomes in a call receiving condition, the controlling unit specifies the ringtone pattern corresponding to the incoming call group in a call receiving condition by referring to the storing unit and controls the telephone terminals belonging to the incoming call group in the call receiving condition to perform a ring operation based on the ringtone pattern.

The telephone control apparatus according to the present invention allows to distinguish which incoming call group is receiving an incoming call by a setting ring tone pattern to each incoming call group. Further, when there is a telephone terminal which belongs to plural incoming call groups and the plural incoming call groups receive incoming calls at the same time, it is possible to distinguish whether there is an incoming call to one of the plural incoming call groups or there are incoming calls to the plural incoming call groups by a corresponding tone pattern to each incoming call group respectively.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Entire Configuration of Telephone System

Figure 1:
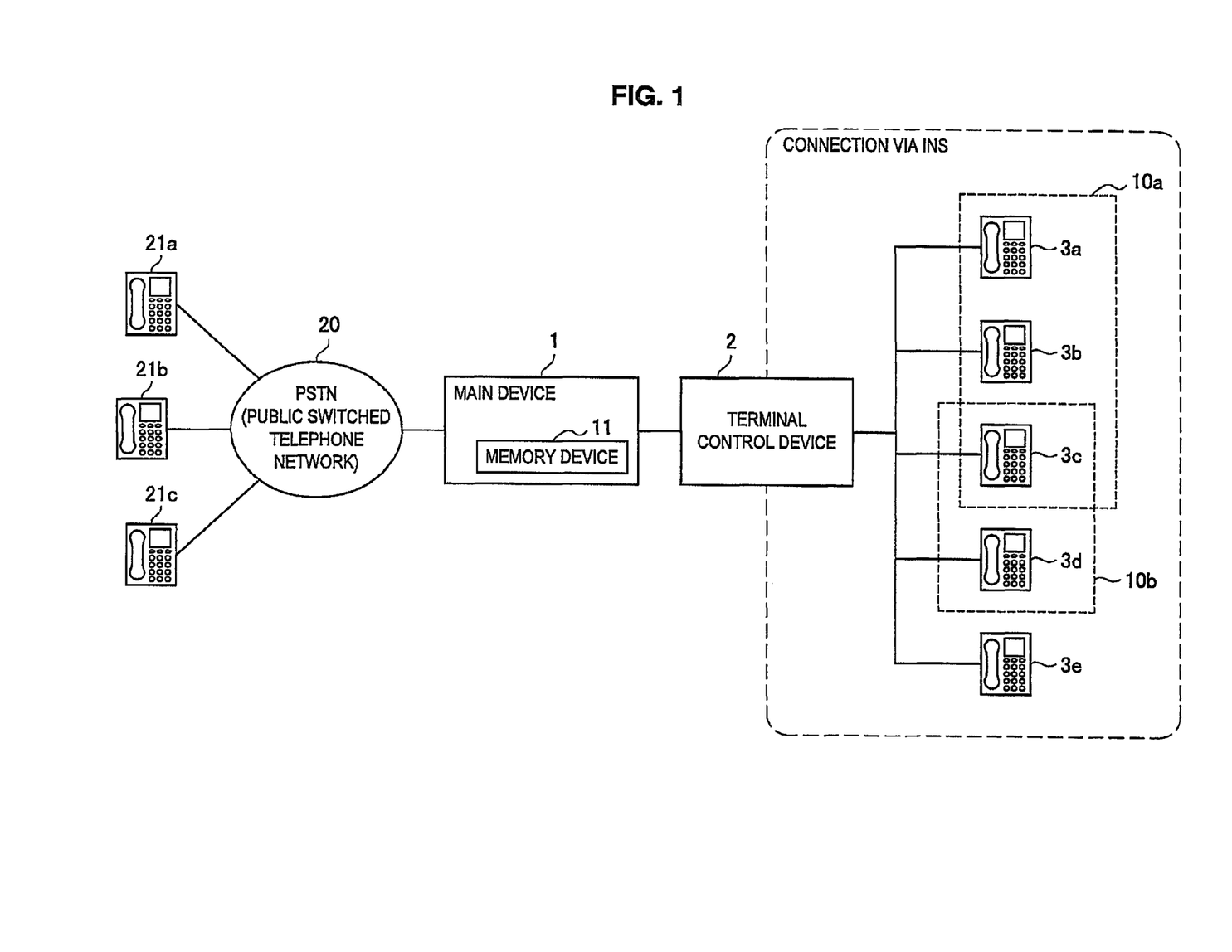
FIG. 1 is an entire block diagram of a telephone system according to a first embodiment of the present invention.

FIG. 1 is an entire block diagram of a telephone system according to a first embodiment of the present invention.

In FIG. 1, a main device 1 that is connected to an external public circuit and serves as a telephone exchange to perform a call control is connected to a terminal control device 2 that covers plural telephone terminals. To the terminal control device 2, telephone terminals 3a to 3e are connected and this constitutes a connection via an INS (registered trademark). Further, the each of the telephone terminals 3a to 3e has one or more keys (not shown) and can be registered to incoming call groups by being allocated to the incoming call group using the keys. In the present embodiment, the telephone terminals 3a to 3e are assumed to respectively have two keys K1 and K2 (not shown). Further, among the telephone terminals 3a to 3e, the telephone terminals 3a to 3c constitute an incoming call group 10a and the telephone terminals 3c and 3d constitute an incoming call group 10b. Further, the main device 1 is connected to a PSTN (public switched telephone network) 20 as the external public circuit and, to the PSTN 20, ordinary telephones 21a to 21c are connected for example. Further, the main device 1 has a memory device 11 for storing a ringtone pattern database or the like in which ringtone patterns are associated with the respective incoming call groups.

Note that a telephone control apparatus corresponds to the main device 1 and the terminal control device 2, storing unit corresponds to the memory device 11 of the main device 1, and controlling unit corresponds to the main device 1 and the terminal control device 2.

Here, in the above description, in order to set which incoming call group the respective telephone terminals are registered, the incoming call group is allocated to the keys provided to the respective telephone terminals. However, the present invention is not limited to this configuration and other methods may be used to set registration of the respective telephone terminals to the incoming call groups.

Further, in the above description, the main device 1 and the terminal control device 2 are provided as separate devices; however, the present invention is not limited to this configuration and a configuration including a single device having both functions may be employed.

Further as described above, the terminal control device 2 and the telephone terminals 3a to 3e are connected via INS (registered trademark); however, the present invention is not limited to this configuration and, for example, a network in which the terminal control device 2 and the telephone terminals 3a to 3e are connected via a LAN and communication protocols of SIP (Session Initiation Protocol) are used to communicate may be employed.

Further, the PSTN 20 is not limited to an analog line network and may be a digital line network such as ISDN (registered trademark), for example.

The telephone terminals 3a to 3e and the ordinary telephones 21a to 21c are not limited to fixed-line phones as shown in FIG. 1 and may be mobile phones, PHSs (registered trademark) or the like.

Further, the configuration of the telephone system shown in FIG. 1 is an example and the numbers of telephone terminals, ordinary telephones and incoming call groups are not limited to what is shown in FIG. 1 and different numbers may be employed.

(Ring Operation of Incoming Call Group in Telephone System)

Figure 2:
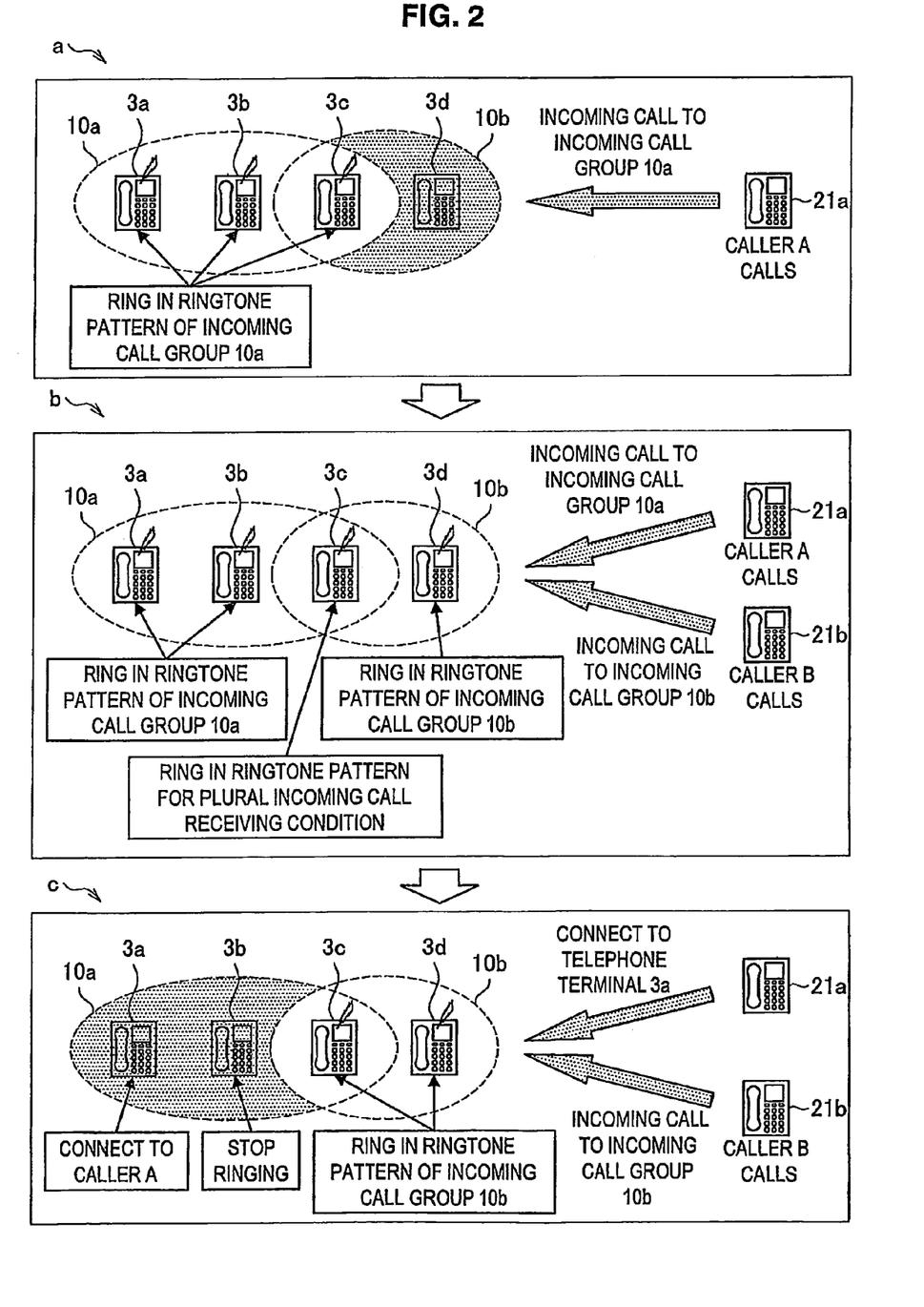
FIG. 2 is diagrams showing a ring operation for ringtone patterns of each incoming call group in the telephone system.
Figure 3:
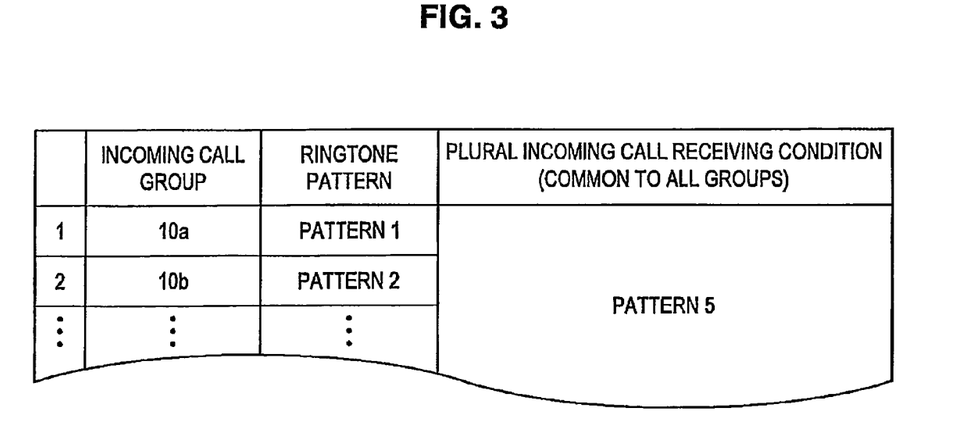
FIG. 3 is a diagram showing database of ringtone patterns corresponding to incoming call groups of the telephone system.

FIG. 2 is a diagram showing a ring operation of a ringtone pattern of each incoming call group in a telephone system according to the first embodiment of the present invention. FIG. 3 is a diagram showing a database of ringtone patterns corresponding to the incoming call groups in the telephone system. In the following description, an outline of the ring operation of the incoming call groups will be described with reference to FIGS. 2 and 3.

Firstly, in "a" of FIG. 2, a caller A calls an incoming call group 10a using an ordinary telephone 21a. Then, the telephone terminals (the telephone terminals 3a to 3c in this example) which belong to the incoming call group 10a, in which the keys of the respective telephone terminal are set to the incoming call group 10a start to ring. Here, the ringtone pattern used to ring is a ringtone pattern 1 which is selected as a pattern corresponding to the incoming call group 10a by the main device 1 shown in FIG. 1 by referring to the ringtone pattern database shown in FIG. 3, which is stored in the memory device 11.

Next, as shown in "b" of FIG. 2, a caller B calls the incoming call group 10b using the ordinary telephone 21b. Then, similarly to the above, the telephone terminal 3d belonging to the incoming call group 10b rings in a ringtone pattern 2 which corresponds to the incoming call group 10b selected by the main device 1 as referring to the ringtone pattern database. Here, both of the incoming call group 10a and the incoming call group 10b become in an incoming call receiving condition (hereinafter, this condition is referred to as a plural incoming call receiving condition), and the telephone terminal 3c which belongs to both of the incoming call group 10a and the incoming call group 10b and is ringing in the ringtone pattern 1 is switched to ring in a ringtone pattern 5, by the main device 1, corresponding to the plural incoming call receiving conditions from the ringtone pattern database.

Then, as shown in "c" of FIG. 2, when the telephone terminal 3a answers the call from the caller A to the incoming call group 10a, conversation between the ordinary telephone 21a and the telephone terminal 3a starts and the telephone terminal 3b, which is another telephone terminal belonging to the incoming call group 10a, stops ringing in the ringtone pattern 1. Further, since the condition of the telephone terminal 3c is switched from the plural incoming call receiving condition to a condition where there is only a call to the incoming call group 10b so that the ringing in the ringtone pattern 5 is switched to ringing in the ringtone pattern 2 corresponding to the incoming call group 10b.

(Ring Operation of Telephone System in Plural Incoming Call Receiving Condition)

Figure 4:
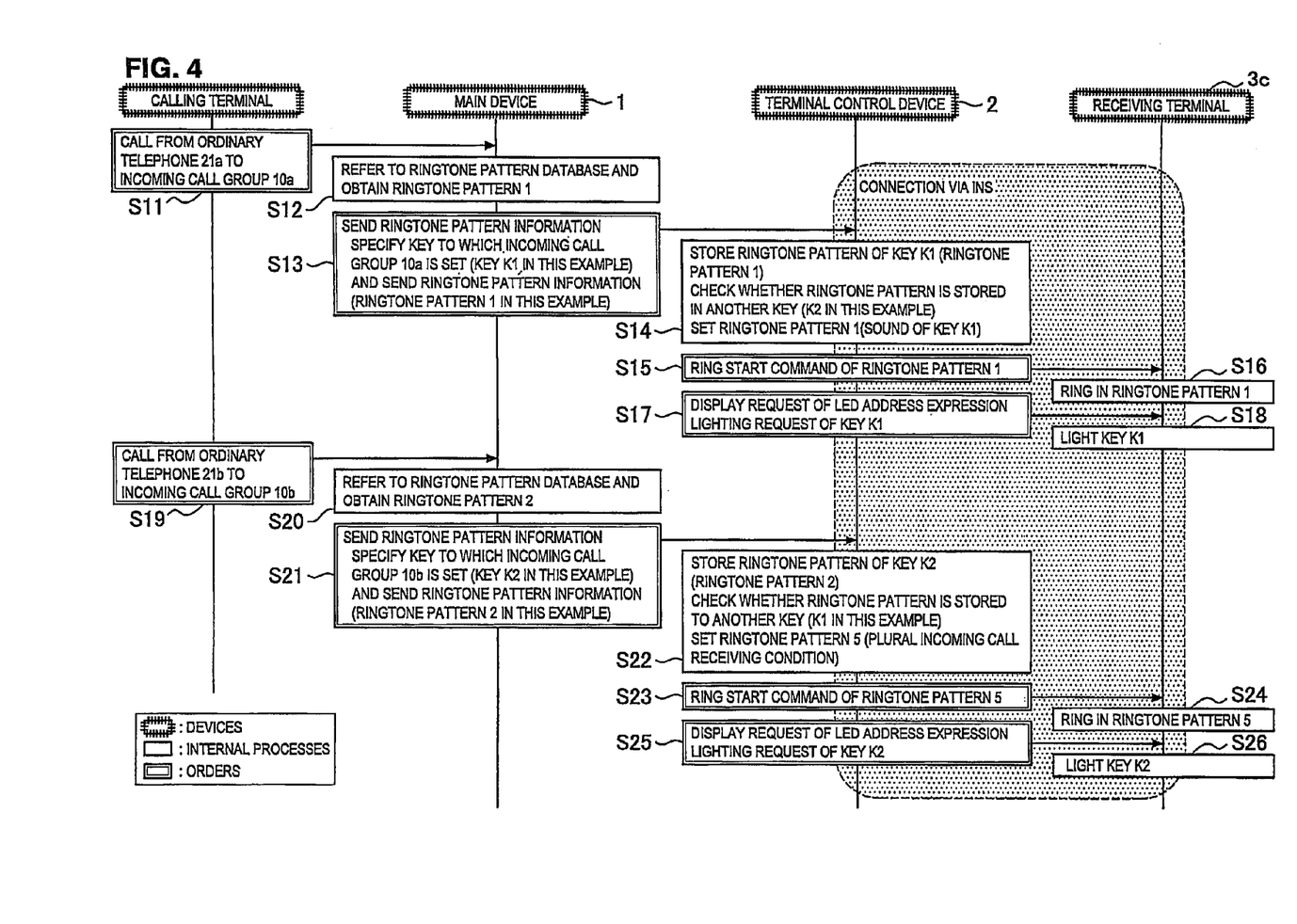
FIG. 4 is a sequence diagram of a ring operation in the telephone system in a plural incoming call receiving condition.
Figure 5:
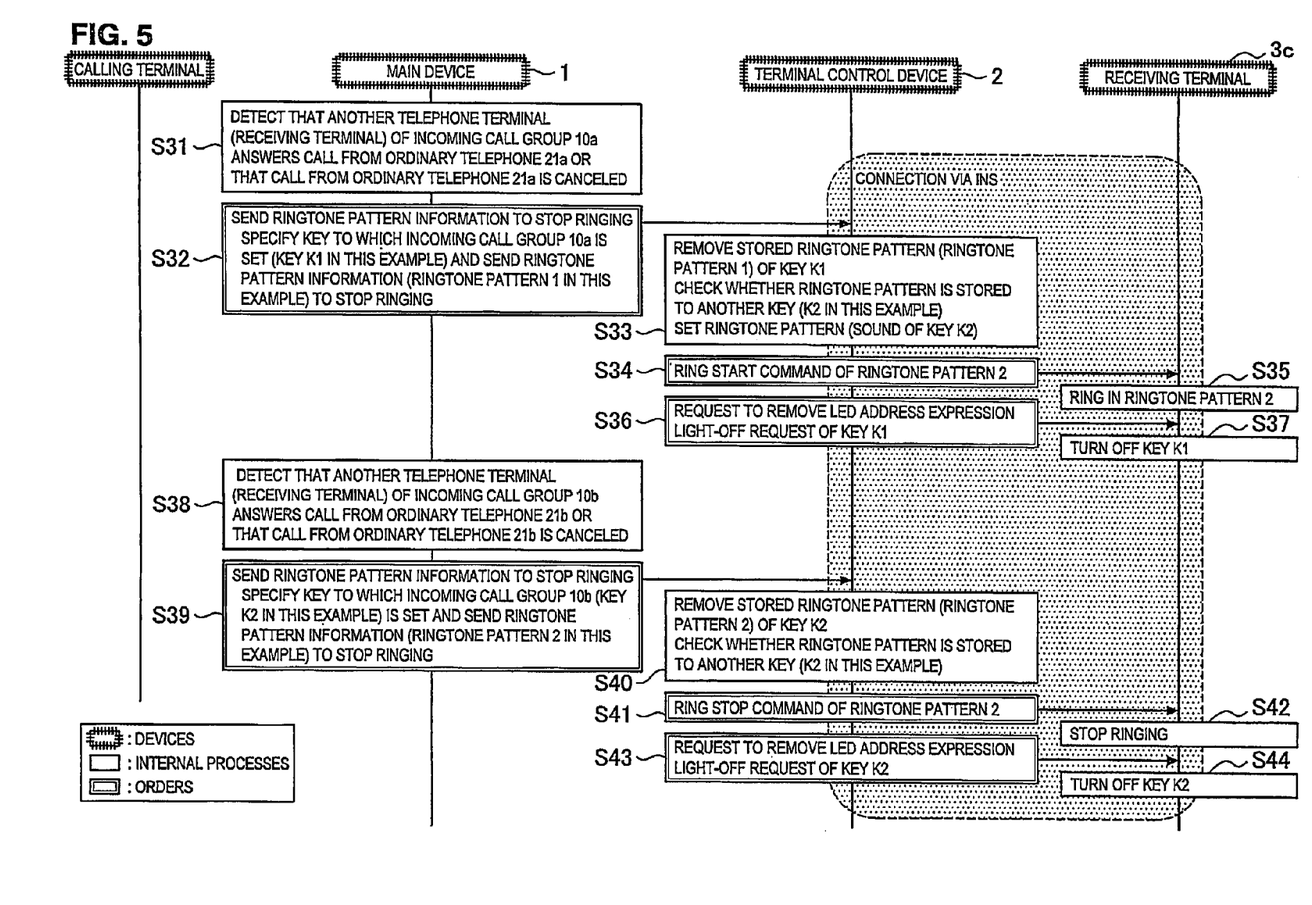
FIG. 5 is a sequence diagram of a ring stop operation in the telephone system in the plural incoming call receiving condition.

FIG. 4 is a sequence diagram of the ring operation of the telephone system in the plural incoming call receiving condition according to the first embodiment of the present invention. FIG. 5 is a sequence diagram of a ringing stop of the telephone system in the plural incoming call receiving conditions. Hereinafter, with reference to FIG. 4, the details of the ring operation of the telephone terminal serving as a receiving terminal and the details of the ring operation of the telephone terminal 3c belonging to the plural incoming call groups which are in the receiving condition especially, in the plural incoming call receiving condition, will be described. Here, it is assumed that the incoming call group 10a is set to the key K1 of the telephone terminal 3c and the incoming call group 10b is set to the key K2.

Firstly in S11 of FIG. 4, the ordinary telephone 21a calls the incoming call group 10a. In S12, the main device 1 detects the call condition, refers to the ringtone pattern database stored in the memory device 11 shown in FIG. 1, and obtains the ringtone pattern 1 which is a ringtone pattern corresponding to the incoming call group 10a. Then, in S13, the main device 1 specifies the telephone terminal having the key to which the incoming call group 10a is set and the key (the key K1 in the case of the telephone terminal 3c) and sends ringtone pattern information (the ringtone pattern 1 in this example) to the terminal control device 2.

In S14, the terminal control device 2 stores, in its memory (not shown), the ringtone pattern 1 to a storage area allocated to the key (the key K1 in the case of the telephone terminal 3c) to which the incoming call group 10a for the telephone terminal belonging to the incoming call group 10a is set. Further, the terminal control device 2 checks whether a ringtone pattern is stored to the storage area allocated to the other key (the key K2 in the case of the telephone terminal 3c) of the telephone terminal. The storage area for the key K2 of the telephone terminal 3c does not store any ringtone pattern at this moment. Then, the ringtone pattern 1 is stored as a ringtone pattern which is used to ring. Note that the medium for storing the ringtone pattern (the ringtone pattern 1 in this example) is described as the above described memory of the terminal control device 2; however, the present invention is not limited to this configuration and a configuration in which the ringtone pattern is stored in the memory device 11 of the main device 1. Then, in S15, the terminal control device 2 sends a start command to ring in the ringtone pattern 1 to the telephone terminals belonging to the incoming call group 10a. In S16, the telephone terminal that receives the ring start command starts a ring operation in the ringtone pattern 1. Further, in S17, the terminal control device 2 sends a lighting request of the key (the key K1 in the case of the telephone terminal 3c) to which the incoming call group 10a is set to the telephone terminals belonging to the incoming call group 10a. Note that the terminal control device 2 may be configured to obtain address information such as a telephone number of the ordinary telephone 21a from the ordinary telephone 21a via the main device 1 and send a request to display the address information on an LED or the like to the telephone terminals belonging to the incoming call group 10a. In S18, the telephone terminal that receives the lighting request of the key lights the key (the key K1 in the case of the telephone terminal 3c).

Next, in S19, the ordinary telephone 21b calls the incoming call group 10b. In S20, the main device 1 detects the call condition, refers to the ringtone pattern database stored in the memory device 11 shown in FIG. 1, and obtains the ringtone pattern 2 as a ringtone pattern corresponding to the incoming call group 10b. Then, in S21, the main device 1 specifies the telephone terminal having the key to which the incoming call group 10b is set and its key (the key K2 in the case of the telephone terminal 3c) and sends the ringtone pattern information (the ringtone pattern 2 in this example) to the terminal control device 2.

In S22, the terminal control device 2 stores, in its memory (not shown), the ringtone pattern 2 to the storage area which is allocated to the key (the key K2 in the case of the telephone terminal 3c) to which the incoming call group 10b for the telephone terminal belonging to the incoming call group 10b is set. Further, the terminal control device 2 checks whether the storage area allocated to the other key (the key K1 in the case of the telephone terminal 3c) of the telephone terminal stores any ringtone pattern. The storage area for the key K1 of the telephone terminal 3c already stores the ringtone pattern 1 at this moment. Thus, since the ringtone pattern 1 is stored in the storage area for the key K1 of the telephone terminal 3c and the ringtone pattern 2 is stored in the storage area for the key K2, the terminal control device 2 determines that the telephone terminal 3c belongs to both of the incoming call group 10a and incoming call group 10b which are in a plural incoming call receiving condition and sets the ringtone pattern 5 corresponding to the plural incoming call receiving condition in the ringtone pattern database as a ringtone pattern which is used to make the telephone terminal 3c to ring in the ringtone pattern 5. Further, when any ringtone pattern is not stored in the storage area allocated for the other key, the ringtone pattern 2 is set as a ringtone pattern which is used to make the telephone terminal to ring in the ringtone pattern 2. Then, in S23, the terminal control device 2 sends a start command to the telephone terminal 3c to ring in the ringtone pattern 5. Further, the terminal control device 2 sends a start command to the telephone terminal belonging to the incoming call group 10b to ring in the ringtone pattern 2. In S24, the telephone terminal that receives the ring start command starts a ring operation in the ringtone pattern according to the ring start command (the ringtone pattern 5 in the case of the telephone terminal 3c). Further, in S25, the terminal control device 2 sends a lighting request of the key to which the incoming call group 10b is set (the key K2 in the case of the telephone terminal 3c) to the telephone terminal belonging to the incoming call group 10b. Note that the terminal control device 2 may be configured to obtain address information such as a telephone number of the ordinary telephone 21b from the ordinary telephone 21b via the main device 1 and sends a request for displaying the address information on the LED or the like to the telephone terminals belonging to the incoming call group 10b. In S26, the telephone terminal that receives the key lighting request lights the key (the key K2 in the case of the telephone terminal 3c).

Next, with reference to FIG. 5, details of a ring stop operation in the telephone terminal serving as a receiving terminal, especially, details of a ring stop operation in the telephone terminal 3c belonging to plural incoming call groups which are receiving calls in a plural incoming call receiving condition will be described. The sequence diagram shown in FIG. 5 shows an operation after the operation shown in the sequence diagram of FIG. 4 is performed.

Firstly, in S31 of FIG. 5, the main device 1 detects that the telephone terminal other than the telephone terminal 3c belonging to the incoming call group 10a answers the call from the ordinary telephone 21a or detects that the call from the ordinary telephone 21a is canceled. Then, in S32, the main device 1 specifies the telephone terminal having the key to which the incoming call group 10a is set and its key (the key K1 in the case of the telephone terminal 3c) and sends ringtone pattern information which ringtone pattern is to be stopped ringing (the ringtone pattern 1 in this example) to the terminal control device 2.

In S33, the terminal control device 2 deletes, from its memory (not shown), the ringtone pattern 1 stored in the storage area allocated to the key (the key K1 in the case of the telephone terminal 3c) to which the incoming call group 10a for the telephone terminal belonging to the incoming call group 10a is set. Further, the terminal control device 2 checks whether any ringtone pattern is stored in the storage area allocated to the other key of the telephone terminal (the key K2 in the case of the telephone terminal 3c). The storage area for the key K2 of the telephone terminal 3c already stores the ringtone pattern 2 at this moment. Thus, the ringtone pattern 2 is set as a ringtone pattern used to make the telephone terminal 3c to ring. Further, when any ringtone pattern is not stored in the storage area allocated to the above other key, "no ringtone pattern" is set as the ringtone pattern used to make the telephone terminal to ring. Then, in S34, the terminal control device 2 sends a start command to the telephone terminal 3c to ring in the ringtone pattern 2. Further, the terminal control device 2 sends a ring stop command to the telephone terminals belonging only to the incoming call group 10a. In S35, the telephone terminal 3c that receives the ring start command switches the ring operation in the ringtone pattern 5 to the ring operation in the ringtone pattern 2. Further, the telephone terminal that receives the ring stop command stops the ring operation. Further, in S36, the terminal control device 2 sends a light-off request of the key to which the incoming call group 10a is set (the key K1 in the case of the telephone terminal 3c) to the telephone terminals belonging to the incoming call group 10a. Here, when the terminal control device 2 has obtained the address information such as a telephone number of the ordinary telephone 21a from the ordinary telephone 21a via the main device 1 and has requested the telephone terminal belonging to the incoming call group 10a to display the address information on the LED or the like as described above, the terminal control device 2 sends a display-clear request of the address information. In S37, the telephone terminal that receives the key light-off request turns off the key (the key K1 in the case of the telephone terminal 3c).

In S38, the main device 1 detects that the telephone terminal belonging to the incoming call group 10b answers the call from the ordinary telephone 21b or detects that the call from the ordinary telephone 21b is canceled. Then, in S39, the main device 1 specifies a telephone terminal having a key to which the incoming call group 10b is set and its key (the key K2 in the case of the telephone terminal 3c) and sends the ringtone pattern information (the ringtone pattern 2 in this example) to make the terminal control device 2 stop ringing.

In S40, the terminal control device 2 deletes, from its memory (not shown), the ringtone pattern 2 stored in the storage area allocated to the key to which the incoming call group 10b for the telephone terminal belonging to the incoming call group 10b (the key K2 in the case of the telephone terminal 3c). Further, the terminal control device 2 checks whether any ringtone pattern is stored in the storage area allocated for the above other key of the telephone terminal (the key K2 in the case of the telephone terminal 3c). When any ringtone pattern is not stored, "no ringtone pattern" is set as the ringtone pattern used to make the telephone terminal to ring. Then, in S41, the terminal control device 2 sends a command to the telephone terminal belonging to the incoming call group 10b to stop ringing in ringtone pattern 2. In S42, the telephone terminal that receives the ring stop command stops the ring operation. Further, in S43, the terminal control device 2 sends a light-off request of the key to which the incoming call group 10b is set (the key K2 in the case of the telephone terminal 3c) to the telephone terminal belonging to the incoming call group 10b. Here, when the terminal control device 2 has obtained address information such as a telephone number of the ordinary telephone 21b from the ordinary telephone 21b via the main device 1 and has requested the telephone terminal belonging to the incoming call group 10b to display the address information on the LED or the like as described above, a display-clear request is sent to clear the address information. In S44, the telephone terminal that receives the key light-off request turns off the key (the key K2 in the case of the telephone terminal 3c).

With the configuration and operation described above, since different ringtone patterns for each of the incoming call groups are stored in the ringtone pattern database in the memory device 11 and the main device 1 refers to the ringtone pattern database to set a ringtone pattern corresponding to each incoming call group, it is possible to determine to which incoming call group the call is being received. Further, even when a certain telephone terminal (for example, the telephone terminal 3c) belongs to plural incoming call groups and the plural incoming call groups become in a plural incoming call receiving condition, it is possible to determine that there are calls to plural incoming call groups by making the telephone terminal to ring in a ringtone pattern corresponding to the plural incoming call receiving condition.

The telephone sets that are calling are described as the ordinary telephones 21a and 21b in FIGS. 2, 4 and 5; however, it is obvious that other ordinary telephones or telephone terminals may be used to call.

Second Embodiment

Entire Configuration of Telephone System

Differences between the entire configuration of a telephone system according to a second embodiment and the entire configuration of the telephone system according to the first embodiment shown in FIG. 1 will be described. The main device 1 has a function for identifying line types, when there is a call to an incoming call group, whether the call is an outside call from the ordinary telephones 21a to 21c or the like, an internal call that is from one of the telephone terminals 3a to 3e to another of the telephone terminals 3a to 3e, or a private dedicated line. Other configurations are the same as those of the first embodiment.

Note that the line identifying unit corresponds to the main device 1.

(Ring Operation of Incoming Call Group in Telephone System)

Figure 6:
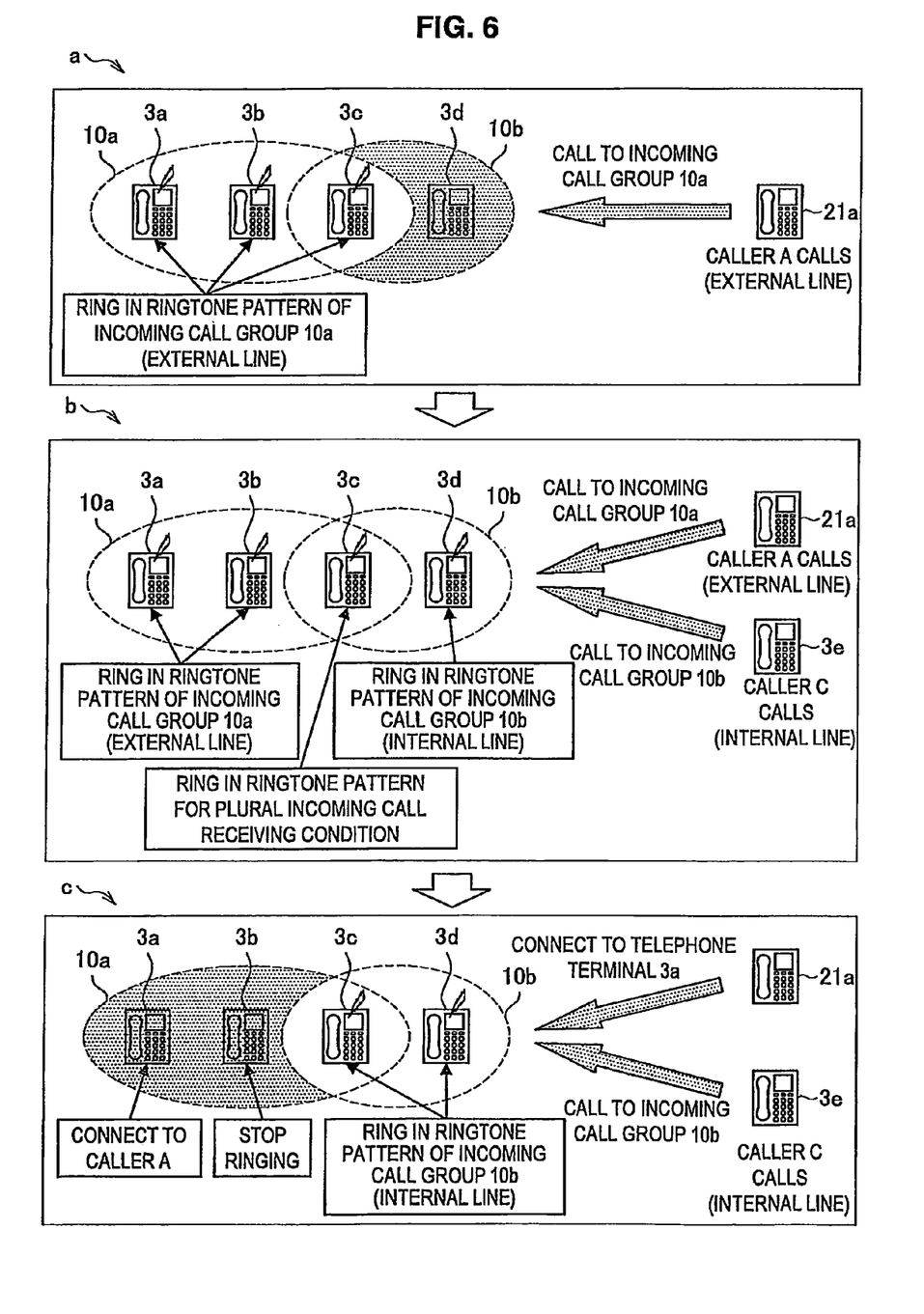
FIG. 6 is diagrams showing a ring operation for ringtone patterns of each incoming call group and for each line type in a telephone system according to a second embodiment of the present invention.
Figure 7:
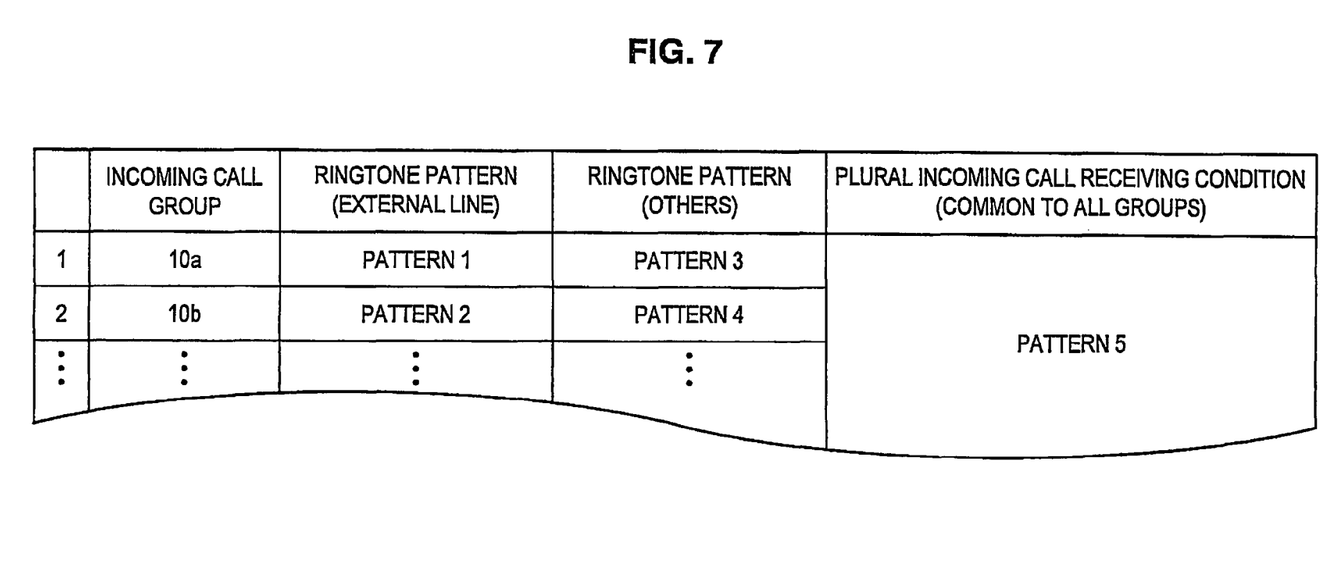
FIG. 7 is a diagram showing a database of ringtone patterns corresponding to the incoming call groups and the ring types in the telephone system.

FIG. 6 is a diagram showing a ring operation of the ringtone pattern for each incoming call group and for each line type in the telephone system according to the second embodiment of the present invention. FIG. 7 is a diagram showing the database of ringtone patterns corresponding to each of the incoming call groups and the line types in the telephone system. Hereinafter, outline of the ring operation for incoming call groups will be described with reference to FIGS. 6 and 7. Firstly, in "a" of FIG. 6, the caller A calls the incoming call group 10a using the ordinary telephone 21a via an external line. Then, the telephone terminals (the telephone terminals 3a to 3c in this example) which are set to the incoming call group 10a using the keys of the respective telephone terminals, that is, which belong to the incoming call group 10a in other words start to ring. In this case, the main device 1 shown in FIG. 1 identifies that the call from the ordinary telephone 21a is via an external line, and the ringtone pattern used to ring is the ringtone pattern 1 selected as a ringtone pattern corresponding to the incoming call group 10a and external lines by referring to the ringtone pattern database shown in FIG. 7 which is stored in the memory device 11.

Next, as shown in "b" of FIG. 6, the caller C calls the incoming call group 10b using the telephone terminal 3e via an internal line. Then, similarly to the above, the telephone terminal 3d belonging to the incoming call group 10b rings in the ringtone pattern 4 corresponding to the incoming call group 10b in the ringtone pattern database, which is selected by the main device 1, and the other lines (an internal line in this example). In this case, the incoming call group 10a and the incoming call group 10b become in an incoming call receiving condition, that is, a plural incoming call receiving condition, so that the telephone terminal 3c that belongs to both of the incoming call group 10a and the incoming call group 10b and is ringing in the ringtone pattern 1 is switched to ring in ringtone pattern 5 corresponding to the plural incoming call receiving condition selected by the main device 1 from the ringtone pattern database.

Then, as shown in "c" of FIG. 6, when the telephone terminal 3a answers the call from the caller A to the incoming call group 10a, conversation between the ordinary telephone 21a and the telephone terminal 3a starts and the telephone terminal 3b that is the other telephone terminal belonging to the incoming call group 10a stops ringing in the ringtone pattern 1. Further, the condition of the telephone terminal 3c switches from the plural incoming call receiving condition to a condition receiving only the call to the incoming call group 10b, so that ringing in the ringtone pattern 5 is switched to ringing in the ringtone pattern 4 corresponding to the incoming call group 10b and other lines (internal line in this example).

(Ring Operation of Telephone System in Plural Incoming Call Receiving Condition)

The ring operation and ring stop operation of the telephone system in the plural incoming call receiving condition according to the second embodiment of the present invention are basically similar to the ring operation sequence diagram shown in FIG. 4 and the ring stop sequence diagram shown in FIG. 5 in the first embodiment. Firstly, the ring operation in the plural incoming call receiving condition will be described with reference to FIG. 4, as focusing on the difference from the first embodiment.

In S12, the main device 1 detects a call from the ordinary telephone 21a, identifies that the call is via an external line, refers to the ringtone pattern database stored in the memory device 11 shown in FIG. 1, and obtains the ringtone pattern 1 as a ringtone pattern corresponding to the incoming call group 10a and the external line.

In S19, the telephone terminal 3e calls the incoming call group 10b. In S20, the main device 1 detects the call condition, identifies that the call is via an internal line, refers to the ringtone pattern database stored in the memory device 11 shown in FIG. 1, and obtains the ringtone pattern 4 which is a ringtone pattern corresponding to the incoming call group 10b and the other lines (the internal line in this example). Then, in S21, the main device 1 specifies a telephone terminal having a key to which the incoming call group 10b is set and its key (the key K2 in the case of the telephone terminal 3c) and sends ringtone pattern information (the ringtone pattern 4 in this example) to the terminal control device 2.

In S22, the terminal control device 2 stores, in its memory (not shown), the ringtone pattern 4 to a storage area allocated to the key to which the incoming call group 10b for the telephone terminal belonging to the incoming call group 10b is set (the key K2 in the case of the telephone terminal 3c). Further, the terminal control device 2 checks whether any ringtone pattern is stored to the storage area allocated to the other key of the telephone terminal (the key K1 in the case of the telephone terminal 3c). In the storage area for the key K1 of the telephone terminal 3c, the ringtone pattern 1 is already stored at this moment. Thus, since the ringtone pattern 1 is stored in the storage area for the key K1 of the telephone terminal 3c and the ringtone pattern 4 is stored in the storage area for the key K2, the terminal control device 2 determines that the telephone terminal 3c belongs the both of the incoming call group 10a and the incoming call group 10b which are in plural incoming call receiving condition and sets the ringtone pattern 5 corresponding to the plural incoming call receiving condition in the ringtone pattern database as a ringtone pattern used to make the telephone terminal 3c to ring. Further, when any ringtone pattern is not stored in the storage area allocated to the another key, the ringtone pattern 4 is stored as a ringtone pattern used to make the telephone terminal to ring. Then, in S23, the terminal control device 2 sends a start command to the telephone terminal 3c to ring in the ringtone pattern 5. Further, a start command is sent to the telephone terminal belonging only to the incoming call group 10b to ring in ringtone pattern 4. In S25, the terminal control device 2 sends a lighting request of the key to which the incoming call group 10b is set (the key K2 in the case of the telephone terminal 3c) to the telephone terminals belonging to the incoming call group 10b. Note that the terminal control device 2 may be configured to obtain address information such as a telephone number of the telephone terminal 3e from the telephone terminal 3e via the main device 1 and send a display request of the address information on the LED or the like to the telephone terminals belonging to the incoming call group 10b.

Next, the ring stop operation in the plural incoming call receiving condition will be described with reference to FIG. 5, as focusing on the difference from that of the first embodiment. In S33, the terminal control device 2 deletes, from its memory (not shown), the ringtone pattern 1 stored in the storage area allocated to the key to which the incoming call group 10a for the telephone terminal belonging to the incoming call group 10a is set (the key K1 in the case of the telephone terminal 3c). Further, the terminal control device 2 checks whether any ringtone pattern is stored in the storage area allocated to the other key of the telephone terminal (the key K2 in the caser of the telephone terminal 3c). In the storage area for the key K2 of the telephone terminal 3c, the ringtone pattern 4 is already stored at this moment. Thus, the ringtone pattern 4 is set as a ringtone pattern used to make the telephone terminal 3c to ring. Further, when any ringtone pattern is not stored in the storage area allocated to the above other key, "no ringtone pattern" is set as a ringtone pattern used to make the telephone terminal to ring. Then, in S34, the terminal control device 2 sends a start command to the telephone terminal 3c to ring in ringtone pattern 4. Further, a ring stop command is sent to the telephone terminal belonging to only the incoming call group 10a. In S35, the telephone terminal 3c that receives the ring start command switches from the ring operation in the ringtone pattern 5 to the ring operation in the ringtone pattern 4. Further, the telephone terminal that receives the ring stop command stops the ring operation.

In S38, the main device 1 detects that the telephone terminal belonging to the incoming call group 10b answers the call from the telephone terminal 3e or detects that the call from the telephone terminal 3e is canceled. Then, in S39, the main device 1 specifies the telephone terminal having the key to which the incoming call group 10b is set and its key (the key K2 in the case of the telephone terminal 3c) and sends the ringtone pattern information which is to be stopped (the ringtone pattern 4 in this example) to the terminal control device 2.

In S40, the terminal control device 2 deletes, from its memory (not shown), the ringtone pattern 4 stored in the storage area allocated to the key to which the incoming call group 10b for the telephone terminal belonging to the incoming call group 10b (the key K2 in the case of the telephone terminal 3c) is set. Further, the terminal control device 2 checks whether any ringtone pattern is stored in the storage area allocated to the other key of the telephone terminal (the key K2 in the case of the telephone terminal 3c). When any ringtone pattern is not stored, "no ringtone pattern" is set as a ringtone pattern used to make the telephone terminals to ring. Then, in S41, the terminal control device 2 sends a command to the telephone terminal belonging to the incoming call group 10b stop ringing in the ringtone pattern 4. Further, in S43, the terminal control device 2 sends a light-off request of the key to which the incoming call group 10b is set (the key K2 in the case of the telephone terminal 3c) to the telephone terminal belonging to the incoming call group 10b. Here, when the terminal control device 2 has obtained address information such as a telephone number or the like of the telephone terminal 3e from the telephone terminal 3e via the main device 1 and has requested the telephone terminal belonging to the incoming call group 10b to display the address information on the LED or the like as described above, the terminal control device 2 sends a display-clear request of the address information.

Operations in other steps are similar to those of the first embodiment.

With the configuration and operation described above, since different ringtone patterns for each incoming call group and each line type are stored in the ringtone pattern database in the memory device 11 and the main device 1 refers to the ringtone pattern database to set a ringtone pattern corresponding to the respective incoming call groups and the respective line types, it is possible to determine which incoming call group is receiving a call and which types of line is being used for the call. Further, similarly to the first embodiment, when a certain telephone terminal (for example, the telephone terminal 3c) belongs to plural incoming call groups and the plural incoming call group become in a plural incoming call receiving condition, since the telephone terminal is made to ring in a ringtone pattern corresponding to the plural incoming call receiving condition, it is possible to determined that there are calls to the plural incoming call groups.

Note that the ringtone pattern database shown in FIG. 7 stores ringtone patterns are stored corresponding to two line types of "external lines" and "others"; however, the present invention is not limited to this configuration and the main device 1 may identify three or more line types and store ringtone patterns for the respective line types to be used to make the terminals to ring. Further, the telephone sets that calls in FIG. 6 and FIGS. 4 and 5, which have been referred to explain the difference from the first embodiment are described as the ordinary telephone 21a and telephone terminal 3e; however, it should be appreciated that other ordinary telephones or telephone terminals may be used to call.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-016590 filed in the Japan Patent Office on Jan. 28, 2009, the entire content of which is hereby incorporated by reference.

What is claimed is:

1. A telephone control apparatus comprising:
a plurality of incoming call groups each including one or more telephone terminals;
a storing unit for storing ringtone patterns, each of the incoming call groups having a corresponding ringtone pattern of the ringtone patterns; and
a controlling unit for performing a ring operation of the one or more telephone terminals belonging to one of the incoming call groups which is to receive a call, based on the corresponding ringtone pattern for the one incoming call group specified from the storing unit,
wherein when a certain incoming call group among the incoming call groups is in a call receiving condition based upon a placed call being received by the telephone control apparatus for the certain incoming call group, the controlling unit specifies the ringtone pattern corresponding to the certain incoming call group by referring to the storing unit, and controls the one or more telephone terminals belonging to the certain incoming call group to perform a ring operation based on the ringtone pattern corresponding to the certain incoming call group,
after the controlling unit controls the one or more telephone terminals belonging to the certain incoming call group to perform the ring operation, the controlling unit determines a key associated with the placed call and controls the one or more telephone terminals belonging to the certain incoming call group to display the key.

2. A telephone control apparatus comprising:
a plurality of incoming call groups that each include one or more telephone terminals;
a line identifying unit for identifying line types of incoming calls for the incoming call groups;
a storing unit for storing different ringtone patterns, each of the incoming call groups having a corresponding ringtone pattern of the ring tone patterns for each of the identified line types; and
a controlling unit for performing a ring operation of the one or more telephone terminals belonging to one of the incoming call groups which is to receive a call, based on the corresponding ringtone pattern for the one incoming call group and a line type of the received call specified by referring to the storing unit,
wherein when a certain incoming call group among the incoming call groups is in a call receiving condition based upon a placed call being received by the telephone control apparatus for the certain incoming call group, the controlling unit specifies the ringtone pattern corresponding to the certain incoming call group and the line type of the placed call specified by the line identifying unit by referring to the storing unit, and controls the one or more telephone terminals belonging to the certain incoming call group to perform a ring operation based on the ringtone pattern,
after the controlling unit controls the one or more telephone terminals belonging to the certain incoming call group to perform the ring operation, the controlling unit determines a key associated with the placed call and controls the one or more telephone terminals belonging to the certain incoming call group to display the key.

3. The telephone control apparatus according to claim 1, wherein
a multi-member telephone terminal of the one or more terminals of the certain incoming call group belongs to several of the incoming call groups including the certain call group, and
further wherein the controlling unit detects that the several incoming call groups are each in a call receiving condition at a same time, and the controlling unit specifies a multi-member ringtone pattern of the ringtone patterns corresponding to the several incoming call groups by referring to the storing unit and controls the multi-member telephone terminal to perform a ring operation based on the multi-member ringtone pattern.

4. The telephone control apparatus according to claim 2, wherein
a multi-member telephone terminal of the one or more terminals of the certain incoming call group belongs to several of the incoming call groups including the certain call group, and
further wherein the controlling unit detects that the several incoming call groups are each in a call receiving condition at a same time, and the controlling unit specifies a multi-member ringtone pattern of the ringtone patterns corresponding to the several incoming call groups by referring to the storing unit and controls the multi-member telephone terminal to perform a ring operation based on the multi-member ringtone pattern.

5. The telephone control apparatus according to claim 3, wherein
   the controlling unit changes a communicating incoming call group of the several incoming call groups from the call receiving condition to a communicating condition by detecting that one of the one or more telephone terminals of the communicating incoming call group is in a communicating condition and the controlling unit releases the call receiving condition of the communicating incoming call group, and
   the controlling unit controls the multi-member telephone terminal that is performing a ring operation based on the multi member ringtone pattern to perform a ring operation by switching to the ringtone pattern corresponding to the certain incoming call group.

6. The telephone control apparatus according to claim 4, wherein
   the controlling unit changes a communicating incoming call group of the several incoming call groups from the call receiving condition to a communicating condition by detecting that one of the one or more telephone terminals of the communicating incoming call group is in a communicating condition and the controlling unit releases the call receiving condition of the communicating incoming call group, and
   the controlling unit controls the multi-member telephone terminal that is performing a ring operation based on the multi member ringtone pattern to perform a ring operation by switching to the ringtone pattern corresponding to the certain incoming call group.

7. A telephone system comprising:
   the telephone control apparatus according to claim 1, wherein
   the telephone system constitutes a network including the telephone terminal and the telephone control apparatus.

8. A telephone system comprising:
   the telephone control apparatus according to claim 2, wherein
   the telephone system constitutes a network including the telephone terminal and the telephone control apparatus.

9. The telephone system according to claim 7, wherein the network is composed of an INS (registered trademark) line.

10. The telephone system according to claim 8, wherein the network is composed of an INS (registered trademark) line.

11. The telephone system according to claim 7, wherein the communication in the network is performed using a communication protocol of SIP (Session Initiation Protocol).

12. The telephone system according to claim 8, wherein the communication in the network is performed using a communication protocol of SIP (Session Initiation Protocol).

13. The telephone control apparatus according to claim 1, wherein the key is address information of a device that originally transmits the placed call to the telephone apparatus.

14. The telephone control apparatus according to claim 13, wherein the address information is a phone number of the device.

15. The telephone control apparatus according to claim 2, wherein the key corresponds to address information of a device that originally transmits the placed call to the telephone apparatus.

16. The telephone control apparatus according to claim 15, wherein the address information is a phone number of the device that originally transmits the placed call.

\* \* \* \* \*